United States Patent [19]
Gard

[11] Patent Number: 5,105,444
[45] Date of Patent: Apr. 14, 1992

[54] SYSTEM FOR HIGH SPEED DATA TRANMISSION

[75] Inventor: Michael F. Gard, New Berlin, Wis.

[73] Assignee: Atlantic Richfield Company, Los Angeles, Calif.

[21] Appl. No.: 406,464

[22] Filed: Sep. 13, 1989

[51] Int. Cl.$^5$ .......................................... H04L 27/10
[52] U.S. Cl. ..................... 375/49; 332/100; 329/300; 375/88; 375/62
[58] Field of Search ...................... 375/23, 45, 88, 62, 375/49, 65, 118, 59; 332/100–102, 112, 118; 329/300–303, 306–307; 307/517, 350, 351

[56] References Cited

U.S. PATENT DOCUMENTS

| | | | |
|---|---|---|---|
| 3,349,328 | 10/1967 | Hunkins et al. | 375/49 X |
| 3,377,560 | 4/1968 | Renshaw | 375/49 X |
| 3,454,718 | 7/1969 | Perreault | 375/49 |
| 3,546,486 | 12/1970 | Jacobson | 329/321 X |
| 3,566,033 | 2/1971 | Young | 375/59 X |
| 3,623,075 | 11/1971 | Bench et al. | 375/49 X |
| 3,632,876 | 1/1972 | Bench | 375/49 |
| 3,665,103 | 5/1972 | Watkins | 375/49 |
| 3,670,250 | 6/1972 | Fritkin | 329/343 |
| 4,021,744 | 5/1977 | Montefusco | 329/300 |
| 4,066,841 | 1/1978 | Young | 375/49 |
| 4,441,193 | 4/1984 | Bell | 375/49 X |
| 4,558,284 | 12/1985 | Zaidenweber | 329/343 |
| 4,596,022 | 6/1986 | Stoner | 375/45 |

FOREIGN PATENT DOCUMENTS

61-192105  8/1986  Japan ..................... 329/343

Primary Examiner—Benedict V. Safourek
Assistant Examiner—Tesfaldet Bocure
Attorney, Agent, or Firm—Vinson & Elkins

[57] ABSTRACT

A modulator (14) and a demodulator (30) cooperate in a system (10) to communicate data at a high data rate using a pulse frequency modulation scheme (PFM). The modulator (14) receives data symbols in a FIFO memory (72) and applies the data symbols, after an adjustable delay, to a variable frequency oscillator (74) to control the frequency of a carrier waveform (16) generated by the oscillator (74). Circuits (76, 78, 98) monitor the carrier waveform (16) and couple to the FIFO memory (72) to control the advancing of data to the oscillator (74). Consequently, the carrir waveform (16) is capable of changing frequency at each half-cycle of the carrier waveform (16), and such changes occur only at zero-crossings of the carrier waveform (16). The carrier waveform (16) is applied through a transmission channel (22) to the demodulator (30). The demodulator (30) includes a comparison circuit (36–42) which produces bipolar signals describing positive and negative half-cycles of the carrier waveform (16). These bipolar signals are de-glitched (96, 98) and applied to start and stop control inputs (52; 54) in respective positive and negative counter circuits (44p, 44n). Each of the counter circuits (44) includes a counter (58) which counts a high speed clock signal supplied by a clock generator (46) during one of the half-cycles to produce a period count that describes the duration of the half-cycle. During a subsequent half-cycle, a translation circuit (60) converts the period count into a amplitude value that describes the data symbol modulated onto the carrier waveform (16), and a resetting circuit (64–68) presets the counter (58) to an initial value.

24 Claims, 2 Drawing Sheets

SYSTEM FOR HIGH SPEED DATA TRANMISSION

CROSS REFERENCE TO RELATED APPLICATIONS

Cross reference is made to: "Period Inverting FM Demodulator", application Ser. No. 406,582, filed on the same date, by the same inventor, and assigned to the said assignee as the present application.

TECHNICAL FIELD OF THE INVENTION

The present invention relates generally to the communication of data at fast data transmission rates. More specifically, the present invention relates to the modulation and demodulation of frequency modulated signals for high speed communication through a transmission channel having a potentially limited bandwidth.

BACKGROUND OF THE INVENTION

Shannon's theorem and the Shannon-Hartley theorem, which are well known to those skilled in the art of information and coding, heuristically state that upper limits on a transmission channel's capacity are constrained by signal-to-noise ratio and channel bandwidth. Moreover, noise constraints and bandwidth constraints can be traded-off against one another to achieve a given channel capacity. In other words, any constraints on data rate imposed by signal-to-noise ratio can be compensated by an appropriately large signal bandwidth, and vice-versa.

Conventional transmission systems often utilize frequency modulation techniques to communicate data over a transmission channel having a limited bandwidth. Such techniques necessitate the use of a modulator and a demodulator to convert data into frequency fluctuations of a carrier waveform and to retrieve such data. The conventional FM demodulators, which include phase locked loop circuits, frequency locked loop circuits, and integrators driven by zero-crossing detectors, typically require an information signal's bandwidth to exhibit less than a maximum deviation frequency from a carrier frequency. Typically, such deviation is around ±15% or ±30% of the carrier frequency. Moreover, conventional FM demodulators require many cycles of a carrier waveform to decode the modulating information. Thus, the practical requirements of conventional FM demodulators potentially cause carrier frequency to artificially limit channel capacity.

For many applications, such as when public airwaves are used to broadcast information, regulatory requirements and power constraints limit channel bandwidths and received signal-to-noise ratios so that such factors, rather than carrier frequency, actually define maximum data rates. However, in other applications, such as when data is being communicated over a long cable, although signal frequency bandwidths are still limited, larger signal frequency bandwidths relative to the carrier frequency can be used. Moreover, control of transmitted power means that signal-to-noise ratios can be more easily manipulated so that they are not limiting. Thus, transmission systems which utilize conventional demodulation techniques artificially limit data rates.

Conventional modulation circuits tend to complement the conventional demodulation techniques. As previously mentioned, conventional demodulation techniques tend to utilize many cycles of a carrier waveform to accurately recover encoded information from the carrier waveform. Likewise, conventional modulation circuits tend to require excessive carrier cycles before producing an accurate instantaneous frequency.

Specifically, in frequency shift keying (FSK) operations a carrier frequency is modulated between discrete instantaneous frequency values. However, conventional modulation circuits briefly output the carrier at instantaneous frequencies intermediate to the proper discrete frequencies before producing an accurate output frequency. Since conventional demodulators require many cycles of the carrier waveform to recover the encoded data, the briefly appearing intermediate frequencies pose no greater limitation than is imposed by the conventional demodulation circuit. However, when a demodulator recovers data from the carrier waveform more quickly, the generation of intermediate frequencies limits the maximum data rates achievable by the transmission system.

SUMMARY OF THE INVENTION

Accordingly, it is an advantage of the present invention that a system for communicating data is provided.

Another advantage is that the present invention provides a system in which a modulator and a demodulator cooperate to communicate data at a high data rate.

Yet another advantage is that the present invention provides an FM modulator in which only substantially accurate output signals are produced in response to input data changes.

Still another advantage is that the present invention provides an FM modulator suitable for modulating a carrier waveform so that one or more different data bits may be carried by each half-cycle of the carrier waveform.

The above and other advantages of the present invention are carried out in one form by a circuit which generates a carrier waveform exhibiting instantaneous frequencies that correspond to a stream of sequentially occurring data symbols. The present invention includes a circuit for generating a portion of the carrier waveform. The generating circuit is configured to output the portion of the carrier waveform in a period of time determined by a first symbol from the stream of data symbols. In addition, the present invention includes a circuit for synchronizing the application of a second symbol to the generating circuit. The second symbol occurs immediately after the first symbol in the stream of data symbols, and the synchronizing circuit synchronizes the application of the second symbol with the termination of the portion of the carrier waveform generated by the generating circuit.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

DETAILED DESCRIPTION OF THE PREFERRED EMBODIMENT

Figure 1:
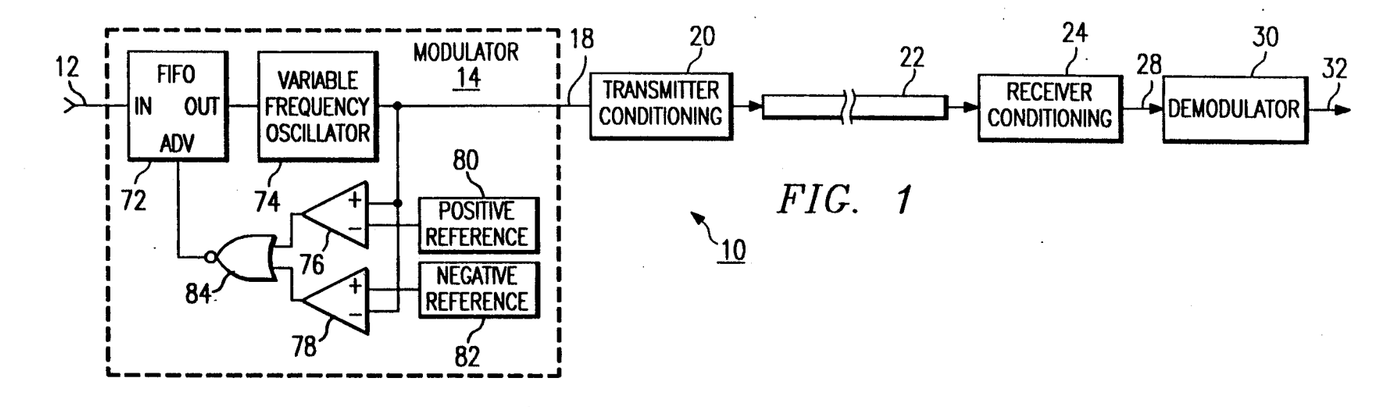
FIG. 1 is a block diagram of a data transmission system constructed in accordance with the teaching of the present invention.

FIG. 1 shows a block diagram of a system 10 for transmitting digital data. The digital data are applied as a stream of symbols at a terminal 12. Each symbol may contain one or more bits of data. Terminal 12 couples to an input of a modulator 14. Although structural details of modulator 14 are discussed below, modulator 14 generally represents a frequency modulation circuit which generates a carrier waveform 16, shown in FIG. 4, at an output 18 of modulator 14. Carrier waveform 16 exhibits a variable instantaneous frequency which is controlled by the stream of data applied at terminal 12.

In the present invention, modulator 14 is capable of changing modulation, or the instantaneous frequency exhibited by carrier waveform 16, during each one-half of a cycle (half-cycle) of oscillation for carrier waveform 16. Moreover, the present invention does not limit modulator 14 to the use of a specific transmission scheme. For example, modulator 14 may generate a binary encoded carrier waveform 16, where carrier waveform 16 exhibits only two possible instantaneous frequency states, and each modulated data symbol contains one bit. Alternatively, modulator 14 may generate a quaternary encoded carrier waveform 16, where carrier waveform 16 exhibits only four possible instantaneous frequency states, and each modulated data symbol contains two bits. Consequently, as a general approach modulator 14 may generate an M-ary encoded carrier waveform 16, where carrier waveform 16 exhibits M possible instantaneous frequency states, and each modulated data symbol contains $\log_2 M$ bits. In the present invention M is an arbitrarily large number constrained by application and design considerations. Regardless of the specific transmission scheme employed by modulator 14, in the preferred embodiment carrier waveform 16 exhibits a form of frequency shift keying (FSK) described herein as pulse frequency modulation (PFM).

Output 18 of modulator 14 couples to an input of a transmitter conditioning circuit 20, and an output of transmitter conditioning circuit 20 couples to a first port of a transmission channel 22. Any one of parallel conductors, coaxial cable, twisted pair, optical fibers, the public electromagnetic frequency spectrum, or the like, may serve as transmission channel 22 in the present invention. However, the preferred embodiment employs a relatively long cable, such as may be encountered in an oil well data logging application or an industrial control application, for transmission channel 22.

Depending on the requirements of transmission channel 22, all or part of transmitter conditioning circuit 20 may be optional. Where required by transmission channel 22, transmitter conditioning circuit 20 utilizes conventional frequency shifting, power amplification, and coupling techniques to convert waveform 16 (see FIG. 4) into a form compatible for transmission through transmission channel 22 and to transmit carrier waveform 16 into transmission channel 22.

Figure 4:
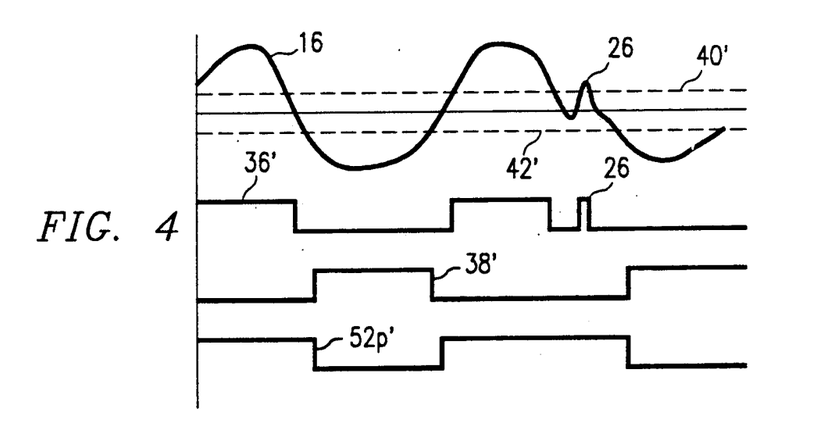
FIG. 4 is a timing diagram of various signals which illustrate the operation of the present invention.

A second port of transmission channel 22 couples to an input of a receiver conditioning circuit 24. Receiver conditioning circuit 24 utilizes conventional techniques to perform functions complementary to the functions performed by transmitter conditioning circuit 20. Thus, receiver conditioning circuit 24 may do one or more of limiting, frequency shifting, filtering, and coupling to transmission channel 22 through an antenna, transformer, or the like. Consequently, an output of receiver conditioning circuit 24 supplies carrier waveform 16 (see FIG. 4) in a form which generally corresponds to the form of carrier waveform 16 output by modulator 14. However, as shown in FIG. 4, carrier waveform 16 may be somewhat altered in spectral content and corrupted by noise, as illustrated by spike 26, due to the effects of transmission channel 22. The output of receiver conditioning circuit 24 couples to a signal input terminal 28 of a demodulator circuit 30.

Although specific details of demodulator 30 are discussed below, demodulator 30 generally performs a frequency demodulation operation on carrier waveform 16 so that an output 32 of demodulator 30 reproduces the stream of digital data applied at terminal 12. Moreover, demodulator 30 is capable of determining the modulation or the instantaneous frequency exhibited by carrier waveform 16 during each half-cycle of oscillation for carrier waveform 16, regardless of the transmission scheme utilized by modulator 14. Thus, demodulator 30 demodulates the PFM data discussed above.

Figure 2:
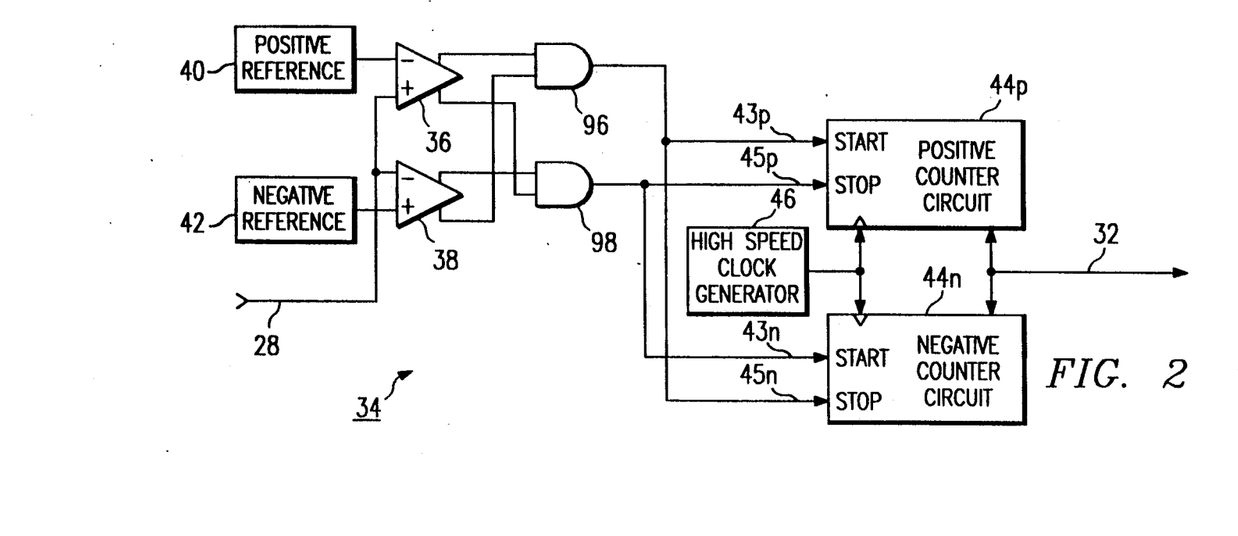
FIG. 2 is a block diagram of a demodulator circuit utilized in connection with the transmission system of the present invention.

FIG. 2 shows a block diagram of a period-inverting discriminator 34 which demodulates PFM data and serves as demodulator 30 in the preferred embodiment. As discussed above, carrier waveform 16 (see FIG. 4) is applied at signal input terminal 28. Terminal 28 couples to a non-inverting input of a positive comparator 36 and to an inverting input of a negative comparator 38. A positive reference voltage source 40 couples to an inverting input of comparator 36, and a negative reference voltage source 42 couples to a non-inverting input of comparator 38. Reference sources 40 and 42 supply DC voltage levels, which remain constant from cycle-to-cycle of modulated waveform 16, as shown in traces 40' and 42', respectively, of FIG. 4.

Comparators 36 and 38 are differential-output devices. Thus, each of comparators 36 and 38 have inverting and non-inverting outputs. FIG. 4 illustrates the operation of comparators 36 and 38. For clarity, only the signals generated by the non-inverting outputs of comparators 36 and 38 are illustrated in FIG. 4, as traces 36' and 38', respectively. Generally speaking, comparator 36 operates to identify beginning and end points in time of a positive half-cycle of modulated waveform 16, and comparator 38 operates to identify beginning and end points in time of a negative half-cycle of modulated waveform 16.

As shown in trace 36', the non-inverting output of positive comparator 36 exhibits a logical high value only when modulated waveform 16 exhibits an amplitude which exceeds the voltage amplitude provided by source 40, illustrated by trace 40' in FIG. 4. Simultaneously, the inverting output of comparator 36 exhibits a logical low value. Likewise, as shown in trace 38', the non-inverting output of negative comparator 38 exhibits a logical high value only when modulated waveform 16 exhibits an amplitude which is less than the voltage amplitude provided by source 42, illustrated by trace 42'. And, simultaneously the inverting output of comparator 38 exhibits a logical low value. Those skilled in the art will recognize that the non-inverting and inverting outputs of comparator 36 switch essentially simultaneous and are always complementary. This characterization also holds true for comparator 38. However, comparators 36 and 38 operate with respect to different reference voltages. Thus, the outputs of comparator 36 do not change states simultaneously with a change in states for the outputs of comparator 38, but independently assume states corresponding to the relationship of modulated waveform 16 with respect to the appropriate reference voltage level.

Thus, comparators 36 and 38 operate as hard limiters to remove amplitude information and fluctuations from modulated waveform 16 by converting modulated waveform 16 into bipolar signals. Since PFM information is encoded into the timing of the transitions between logical states of the output signals from comparators 36 and 38, this limiting operation has no substantial effect on the information content carried by modulated carrier waveform 16. However, some spurious transitions, or glitches, may result from noise, as shown at spike 26 of trace 36'.

Referring to FIG. 2, the non-inverting output of comparator 36 couples to a first input of an AND gate 96, and the inverting output of comparator 38 couples to a second input of AND gate 96. Likewise, the non-inverting output of comparator 38 couples to a first input of an AND gate 98, and the inverting output of comparator 36 couples to a second input of AND gate 98. An output of AND gate 96 couples to a start input 43p of a positive counter circuit 44p and to a stop input 45n of a negative counter circuit 44n. Conversely, an output of AND gate 98 couples to a stop input 45p of counter circuit 44p and to a start input 43n of counter circuit 44n.

The use of differential outputs from comparators 36 and 38, when taken with the use of AND gates 96 and 98, accomplish a de-glitching function. Due to the cross-coupling between comparators 36 and 38 and AND gates 96 and 98, the output of AND gate 96 does not go high (which starts counter circuit 44p) until the non-inverting output of comparator 36 and the inverting output of comparator 38 have both gone high. In other words, modulated waveform 16 must be more positive than both the positive reference 40 and the negative reference 42. If both of these conditions are not met, the modulated waveform 16 is either in transition between the two reference levels or was caused by a noise spike, as shown at spike 26 in FIG. 4. Only when both conditions are satisfied simultaneously can the modulated waveform 16 be considered to have made a positive transition.

Those skilled in the art will recognize that the amount of noise immunity in this invention is related to the voltage separation between positive reference 40 and negative reference 42. Furthermore, it is recognized that single output comparators followed by inverters could be used in place of differential comparators 36 and 38. However, for high speed applications, the differential devices are preferred.

A high speed clock generator 46 has an output 47 which couples to clock inputs of counter circuits 44p and 44n, and data busses of counter circuits 44p and 44n couple together and together serve as output 32 from demodulator 30, discussed above.

Figure 3:
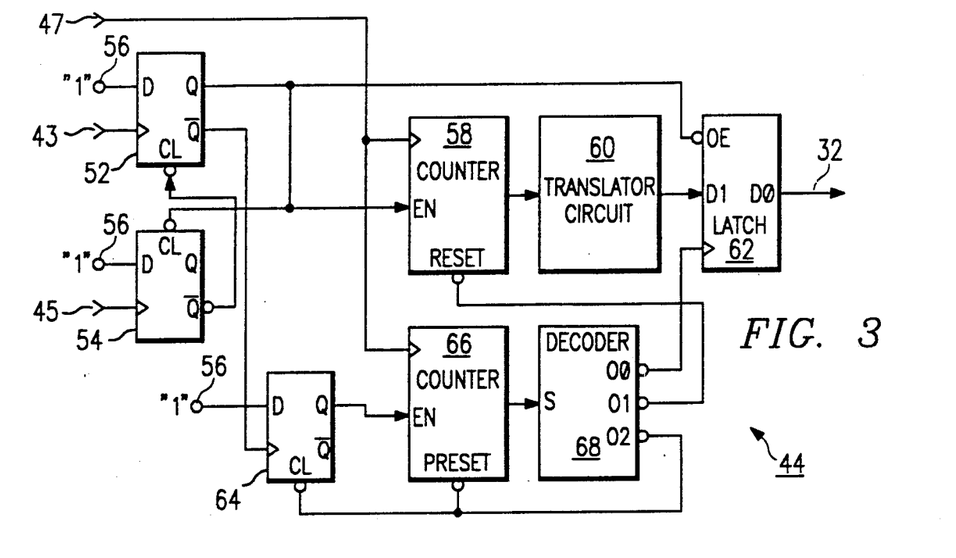
FIG. 3 is a block diagram of a counter circuit portion of the demodulator circuit of the present invention.

FIG. 3 shows a block diagram which more specifically illustrates the structure of counter circuits 44p and 44n (see FIG. 2). In the preferred embodiment, counter circuits 44p and 44n are substantially identical to one another. Thus, FIG. 3 merely shows a single counter circuit 44 which may serve as either one of counter circuits 44p and 44n.

Generally speaking, each of counter circuits 44 incorporates a de-glitching circuit to remove noise spikes, and each incorporates a timing circuit to measure the duration between the beginning and end points of the half-cycle identified by AND gates 96 and 98. The timing circuit measures events which occur at a substantially faster rate than the anticipated instantaneous frequencies exhibited by modulated waveform 16 (see FIG. 4). These events are provided by transitions between logical states of a clock signal generated by clock generator 46. Moreover, counter circuits 44p and 44n alternate between a counting mode and a resetting mode, with each of circuits 44 continuously operating in an opposite mode from the other one of circuits 44.

Specifically, start input 43, discussed above, of counter circuit 44 couples to a clock input of a flip-flop 52, and stop input 45, discussed above, couples to a clock input of a flip-flop 54. "D" inputs of flip-flops 52 and 54 each couple to a terminal 56, which is adapted to supply a logical high value. A non-inverting output of flip-flop 52 couples to a clear input of flip-flop 54, and an inverting output of flip-flop 54 couples to a clear input of flip-flop 52.

Flip-flops 52 and 54 also serve as a de-glitching circuit, and the non-inverting output of flip-flop 52 controls counting operations for the remainder of counting circuit 44 by defining counting and resetting modes of operation. Trace 52p' of FIG. 4 represents the signal supplied at the non-inverting output of flip-flop 52 in counter circuit 44p and depicts the operation of this de-glitching circuit. Accordingly, the non-inverting output of flip-flop 52 is clocked to a logical high value when the amplitude of modulated waveform 16 initially exceeds the threshold provided by references 40 and 42 (see FIG. 3). However, the state of flip-flop 52 does not change when modulated waveform 16 initially exhibits an amplitude less than the threshold provided by reference 40 yet greater than the threshold provided by reference 42. Thus, minor noise spikes, such as spike 26, have no effect on the state of flip-flop 52. Only when the amplitude of modulated waveform 16 eventually becomes less than the threshold provided by reference 42 does the state of flip-flop 52 change. Such change occurs in response to the clocking of flip-flop 54, which clears flip-flop 52 and is then cleared itself. As shown in trace 52p', noise spike 26 has been removed.

Counter circuit 44 measures the duration for which the non-inverting output of flip-flop 52 exhibits a logical high value, which represents the above-discussed counting mode of operation. Thus, the non-inverting output of flip-flop 52 couples to an enable input of a counter 58, and the clock input 47 from high speed clock generator 46 (see FIG. 3) couples to a clock input of counter 58.

In the preferred embodiment of the present invention, the clock signal supplied at clock input 47 exhibits a constant frequency which is as high as is reasonably possible. When the non-inverting output of flip-flop 52 is at a logical high value, counter 58 is enabled and counts the clock signal. When the non-inverting output of flip-flop 52 is at a logical low value, counter 58 is disabled and refrains from counting the clock signal. As discussed below, counter 58 begins counting from a preset count when it becomes enabled. Thus, the final count, or period count, achieved when counter 58 becomes disabled corresponds to the period of time which transpired while counter 58 was enabled. Moreover, the use of as high a frequency as is reasonably possible for the clock signal increases the precision with which this duration can be measured.

An output of counter 58, which may include as many as 12 or more bit lines due to the high frequency of the clock signal, presents a duration value to an input of a translation circuit 60. An output of translation circuit 60 couples to a data input of a latch 62, and an output of latch 62 couples to data bus 32, discussed above. Moreover, the non-inverting output of flip-flop 52 couples to an output enable input of latch 62, and the inverting output of flip-flop 52 couples to a clock input of a flip-flop 64. A "D" input of flip-flop 64 couples to terminal 56, which supplies a logical high value. A non-inverting output of flip-flop 64 couples to an enable input of a counter 66, and a clock input of counter 66 couples to clock input 47 to receive the clock signal supplied by clock generator 46. A data output of counter 66 couples to selection inputs of a decoder 68, and an "0" output of decoder 68 couples to a clock input of latch 62. An "01" output of decoder 68 couples to a preset or reset input of counter 58, and an "02" output of decoder 68 couples to a preset or reset input of counter 66 and to a clear input of flip-flop 64.

When the non-inverting output of flip-flop 52 switches to a logical low value, the inverting output of flip-flop 52 switches to a logical high value and the reset mode is initiated. This causes the non-inverting output of flip-flop 64 to assume a logical high value, thereby enabling counter 66. At the same time, the period count output of counter 58 becomes stable because counter 58 now refrains from counting the clock signal. Translation circuit 60 then translates this duration value into an amplitude value which describes modulation information encoded into modulated waveform 16 (see FIG. 4), and the amplitude value becomes stable after an appropriate delay.

Translation circuit 60 may be embodied in any one of several forms. For a general purpose, M-ary modulation application, translation circuit 60 is a PROM or other memory device. Thus, the input to translation circuit 60 represents an address input to the memory device, the output represents data outputs of the memory device, and the translation from time duration to amplitude occurs through a table look-up operation where the duration value serves as an index to the table. Since the duration value describes a period of a half-cycle of modulated waveform 16, this duration value is inversely proportional to the frequency of frequency modulated waveform 16. Hence, discriminator 34 (see FIG. 2) is referred to as a "period-inverting discriminator."

The data stored in the look-up table may be predetermined. Assuming, for example, that counter 58 outputs a 12 bit number which may describe any one of 4096 possible discrete duration values detected by counter 58. Each of the 4096 possible duration values corresponds to a unique instantaneous frequency of modulated waveform 16 (see FIG. 4). The memory device of translation circuit 60 also has 4096 memory locations. Each of the 4096 memory locations contains an amplitude value descriptive of a modulating amplitude which causes modulated waveform 16 to exhibit the associated instantaneous frequency. Thus, a memory device translates the duration value into a digital amplitude value.

Of course, the output from counter 58 need not provide 12 bits, and translation circuit 60 need not be a memory device. For example, when modulated waveform 16 carries binary digital data, the translation decisions become simplified compared to M-ary data. For binary data, translation circuit 60 needs only to resolve whether the period indicated by the duration value comes closer to describing the period of a relatively low frequency or the period of a relatively high frequency. Consequently, for binary data, translation circuit 60 may advantageously be a comparator in which a first comparison input serves as the input to translation circuit 60 and the output of translation circuit 60 is a single bit comparison output line. In this application, a second comparison input for the comparator couples to a predetermined data value. Period counts greater than the predetermined data value suggest the lower of the relatively high and low frequencies while period counts less than the predetermined data value suggest the higher, assuming that counter 58 counts up from zero.

Counter 66 cooperates with decoder 68 to delay the latching of the digital amplitude value output from translation circuit 60 into latch 62 until the amplitude value becomes stable. Thus, the particular count decoded by decoder 68 to cause the "0" output to activate is not critical in the present invention. After the latching of latch 62, the "01" output of decoder 68 activates, thereby either resetting counter 58 or presetting counter 58 to a predetermined value. After the resetting or presetting of counter 58, output "02" of decoder 68 activates to preset or reset counter 66 to a predetermined value and to clear flip-flop 64. At this point, the output of latch 62 has been enabled so that the digital amplitude value is output to data bus 32, and counters 58 and 66 are reset for a subsequent counting cycle.

Referring back to FIGS. 1-2, the above discussion of period inverting discriminator 34, which serves as demodulator 30 in system 10, points out that demodulator 30 extracts independently modulated information from each half-cycle of carrier waveform 16 (see FIG. 4). Consequently, modulator 14 in system 10 employs features which ensure that each half-cycle of carrier waveform 16 accurately reflects modulating information. Modulator 14 shown in FIG. 1 depicts an analog implementation of such features.

Specifically, terminal 12 couples to a data input of a first-in/first-out (FIFO) memory 72. A data output of FIFO memory 72 couples to a control input of a variable frequency oscillator 74, such as a voltage controlled oscillator (VCO). An output of oscillator 74 serves as output 18 from modulator 14 and couples to a non-inverting input of a positive comparator 76 and to an inverting input of a negative comparator 78. An output of a positive reference voltage source 80 couples to an inverting input of comparator 76, and an output of a negative reference voltage source 82 couples to a non-inverting input of comparator 78. Outputs of comparators 76 and 78 couple to inputs of a logic element, such as a NOR gate 84, and an output of NOR gate 84 couples to an advance input of FIFO memory 72.

Oscillator 74 in the preferred embodiment of the present invention utilizes conventional techniques to respond almost instantly in generating an accurate output frequency from a changed data symbol applied at its control input. Thus, FIFO memory 72 and a zero-crossing detector formed from comparators 76 and 78, reference sources 80 and 82, and logic element 84 cooperate to synchronize the application of data symbols to oscillator 74 with the termination of half-cycles of carrier waveform 16 (see FIG. 4).

As discussed above, demodulator 30 divides carrier waveform 16 (see FIG. 4) into positive and negative half-cycles. The termination of one half-cycle and the beginning of a subsequent half-cycle occur substantially at the zero crossing of carrier waveform 16. In other words, demodulator 30 defines the termination of a half-cycle as being when the amplitude of carrier waveform 16 exhibits a zero. Of course, those skilled in the art will recognize that various DC biasing implementations may actually require this zero amplitude to occur at the amplitude which represents the average of peak positive and negative amplitudes achieved by carrier waveform 16. Generally speaking, the zero-crossing detector of modulator 14 detects the occurrence of this zero amplitude condition and controls FIFO memory 72 to output a subsequent data symbol upon this occurrence.

More specifically, the zero-crossing detector of modulator 14 actually represents a near-zero-crossing detector. Positive and negative reference voltages sources 80 and 82 provide reference voltages near zero volts, similar to voltages provided by sources 40 and 42 (see FIG. 2) and depicted by traces 40' and 42' in FIG. 4. However, the voltage levels of sources 80 and 82 need not equal the voltages of sources 40 and 42 and are preferably less. Thus, comparators 76 and 78 activate when carrier waveform 16 (see FIG. 4) nears the zero amplitude. Logic element 84 combines the outputs of comparators 76 and 78 so that FIFO memory 72 advances data whenever carrier waveform 16 approaches zero. The voltage levels of references 80 and 82 are chosen so that propagation delays from comparators 76 and 78, logic element 84, FIFO memory 72, and oscillator 74 cause oscillator 74 to operate at a changed frequency precisely as carrier waveform 16 exhibits a zero amplitude. In this manner, modulator 14 is prevented from generating carrier waveform 16 half-cycles with periods that correspond to inaccurate modulation frequencies.

Figure 5:
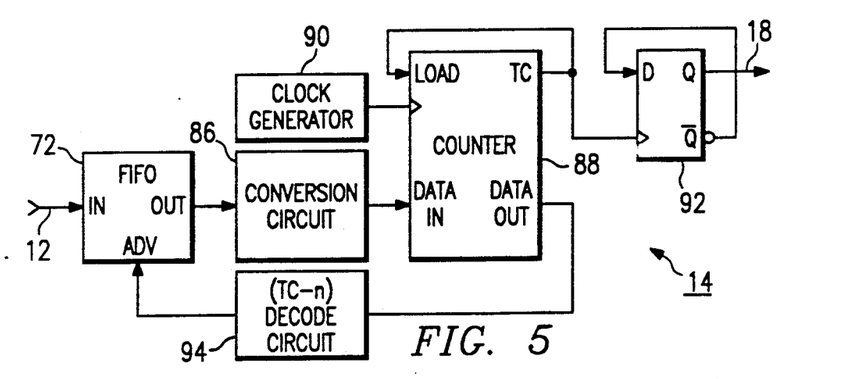
FIG. 5 is a block diagram of a digital embodiment of a modulator portion of the present invention.

FIG. 5 shows a block diagram of a digital embodiment of a pulse frequency modulation circuit which may advantageously serve as modulator 14. Accordingly, terminal 12 couples to the data input of FIFO memory 72, as discussed above in connection with FIG. 1. The data output of FIFO memory 72 couples to an input of a conversion circuit 86, and an output of conversion circuit 86 couples to a data input of a counter 88. A high speed clock generator 90 has an output which couples to a clock input of counter 88, and a thermal count output Tc of counter 88 couples to a load input of counter 88 and to a clock input of a flip-flop 92. Flip-flop 92 is configured to toggle upon receipt of a clock signal from counter 88. A data output of counter 88 couples to an input of a decoding circuit 94, and an output of circuit 94 couples to the advance input of FIFO memory 72.

In modulator 14 of FIG. 5, the toggling of flip-flop 92 generates the half-cycles of carrier waveform 16. Thus, flip-flop 92 generates a square wave having a variable period separately adjustable for each half-cycle of the square wave. The variability in the square wave period is provided by loading counter 88 with a count preset value which causes a desired duration to transpire before the terminal count output Tc for counter 88 activates. The terminal count may represent a carry or borrow output, depending on whether counter 88 counts up or down. Moreover, the preset value depends upon the frequency of a clock signal generated by clock generator 90. Preferably, the frequency of clock generator 90 approximately equals the frequency of clock generator 46, discussed above in connection with FIG. 2, to optimize precision and minimize errors in data communicated using system 10 (see FIG. 1).

Decode circuit 94 utilizes conventional gates to determine a point in time shortly before the instant the terminal count output of counter 88 activates. For example, if counter 88 is configured to count down to a value of zero before activating the terminal count output Tc, then decode circuit 94 may advantageously decode a count value of 1–2. When this value has been decoded, decode circuit 94 causes FIFO 72 to advance data, so that a new, stable data symbol will be present at the load input of counter 88 when the terminal count output activates. Thus, when the terminal count activates, the load input of counter 88 is controlled so that this new preset value is loaded into counter 88 to define the duration of a subsequent half-cycle.

Conversion circuit 86 converts a data symbol output from FIFO 72 into a preset count for loading into counter 88. For a general purpose application, a PROM or other memory device may advantageously serve as conversion circuit 86, in a manner similar to that described above for translation circuit 60 (see FIG. 3). However, when simpler data transmission schemes, such as binary PFM data transmission, are being implemented by system 10 (see FIG. 1), conversion circuit 86 may comprise a parallel-to-serial conversion with a single bit being directly fed into counter 88.

To summarize, the present invention provides a system in which modulator 14 (see FIGS. 1 and 5) and demodulator 30 (see FIGS. 1–2) cooperate to communicate data at a high data rate. The high data rate results because the PFM disclosed herein permits each half-cycle of carrier waveform 16 (see FIG. 4) to carry a different data symbol, and each data symbol contains $\log_2 M$ bits, where M is an arbitrarily large number that is limited by design constraints. These design constraints are generally controllable by the designer. For example, basic design constraints that limit M are the speed of the clock signal produced by clock generator 46 (see FIG. 2) and the speed of counter 58 (see FIG. 3). Moreover, modulator 14 separates the M discrete frequencies from one another within the bandwidth usable by transmission channel 22 so that counter 58 produces corresponding period counts which differ from one another by at least two counts. Modulator 14 is internally synchronized so that each half-cycle of carrier waveform 16 exhibits only substantially accurate frequencies. In other words, carrier waveform 16 exhibits only the prescribed M discrete frequencies and does not slew between any two of the M frequencies to change output symbols. In addition, the designer can manipulate signal-to-noise ratios by the design of conditioning circuits 20 and 24 and the design and selection of components utilized by modulator 14 and demodulator 30 so that an acceptable bit error rate is obtained.

As an example of the data rates achievable by system 10, assume that transmission channel 22 provides system 10 with a 10 KHz bandwidth channel between 100 KHz and 110 KHz. Assume further that a system 10 utilizes a binary transmission scheme, in which M equals two and each symbol carries one bit. Then, the data rate communicated by system 10 vary between 200 and 220 Kbps, depending on the content of the data. Using the same 10 KHz bandwidth channel between 100 KHz and 110 KHz, a 4-ary transmission scheme, in which M equals four and each symbol carries two bits, communicates data at a data rate which varies between 400 and 440 Kbps.

The present invention has been described above with reference to preferred embodiments. However, those skilled in the art will recognize that changes and modifications may be made in these preferred embodiments without departing from the scope of the present invention. Accordingly, those skilled in the art will recognize that each of the circuit blocks presented herein may be implemented using a variety of techniques. For example, counters 58 and 66 of FIG. 3 may count-up or count-down and may utilize counter chips having enable inputs or utilize external gates to achieve the counting functions described herein. Moreover, those skilled in the art will recognize that the polarities, magnitudes, and frequencies discussed above are arbitrary parameters generally under the control of the designer. These and other changes and modifications which are obvious to those skilled in the art are intended to be included within the scope of the present invention.

What is claimed is:

1. A circuit for generating a frequency modulated signal responsive to a sequence of data elements, comprising:
    means for generating a predetermined portion of a cycle of said modulated signal, said generating means having an input for receiving said data elements, and having an output for presenting said portion of said cycle over a period of time determined by the value of the data element applied to said input;
    a buffer, comprising a FIFO memory, said buffer having a data input for receiving said sequence of data elements, having a control input, and having an output for presenting one of its received data elements in sequence to the input of said generating means in response to a control signal received at said control input; and
    means, having an input coupled to the output of said generating means, and having an output coupled to said control input of said buffer, for detecting said predetermined point in the cycle of said modulated signal and for generating said control signal in response thereto.

2. The circuit of claim 1, wherein said predetermined portion of said cycle is approximately a half cycle.

3. The circuit of claim 2 wherein said modulated signal exhibits a positive and a negative peak value in successive half-cycles;
    and wherein said predetermined point in the cycle is at an amplitude approximately the midpoint of said positive and negative peak values.

4. The circuit of claim 3, wherein said detecting means comprises:
    a first comparator circuit coupled to the output of said generating means for comparing said modulated signal with a first selected voltage, said first selected voltage above said midpoint;
    a second comparator circuit coupled to the output of said generating means for comparing said modulated signal with a second selected voltage, said second selected voltage below said midpoint;
    an advance circuit, coupled to said first and second comparator circuits, for generating said control signal responsive to said comparators indicating that said modulated signal is at a voltage between said first and second selected voltages;
    wherein said first and second selected voltages are selected in such a manner that said buffer presents said one of its received data elements to the input of said generating means at such a time that said generating means begins presenting the portion of the cycle corresponding to said data element at approximately said midpoint.

5. The circuit of claim 1, wherein said generating means comprises:
    a clock generator circuit for generating a clock signal having a frequency greater than the frequency of said modulated signal; and
    a counter having a clock input coupled to said clock generator circuit, a preset input coupled to said buffer, a terminal count output, a count output for presenting the value of said counter, and a load input coupled to said terminal count output, said counter for counting a number of cycles of said clock signal corresponding to the digital data presented by said FIFO memory, and for presenting an output signal at its terminal count output corresponding to completion of said counting;
    wherein said terminal count output of said counter corresponds to the output of said generating means;
    and wherein said detecting means comprises a decoder having an input coupled to said counter output, for presenting said control signal at its output responsive to said counter output having a selected value.

6. The circuit of claim 1 wherein said generating means comprises a voltage controlled oscillator.

7. A modulation circuit for generating a signal which is frequency modulated according to a sequence of digital data, said circuit comprising:
    synchronizing means, comprising a FIFO memory, for receiving said sequence of digital data and presenting a value in said sequence of digital data at its output in response to a control signal;
    a variable frequency signal generating circuit coupled to the output of said synchronizing means to generate said modulated signal having an instantaneous frequency according to said sequence of digital data presented at said output of said synchronizing means; and
    means, coupled to the output of said variable frequency signal generating circuit and to said synchronizing means, for generating said control signal in response to each occurrence of said modulated signal crossing a predetermined amplitude.

8. A modulation circuit as claimed in claim 7 wherein said predetermined amplitude is approximately the midpoint of the maximum and minimum amplitudes of said modulated signal in a cycle.

9. The modulation circuit of claim 8, wherein said generating means comprises:
    a first comparator circuit coupled to the output of said variable frequency signal generating circuit for comparing said modulated signal with a first selected voltage, said first selected voltage above said midpoint;
    a second comparator circuit coupled to the output of said variable frequency signal generating circuit for comparing said modulated signal with a second selected voltage, said second selected voltage below said midpoint; and
    an advance circuit, coupled to said first and second comparator circuits, for generating said control signal responsive to said comparators indicating that said modulated signal is at a voltage between said first and second selected voltages;
    wherein said first and second selected voltages are selected in such a manner that said synchronizing means presents a value in said sequence at its output in such a manner that said variable frequency signal generating circuit begins presenting the corresponding instantaneous frequency when said modulated signal is at approximately said midpoint.

10. A modulation circuit as claimed in claim 7, wherein said variable frequency signal generating circuit comprises:
- a clock generator circuit for generating a clock signal having a frequency greater than the frequency of said modulated signal; and
- a counter having a clock input coupled to said clock generator circuit, a preset input coupled to said FIFO memory, a terminal count output, and a load input coupled to said terminal count output, said counter for counting a number of cycles of said clock signal corresponding to the digital data presented by said FIFO memory, and for presenting an output signal at its terminal count output corresponding to completion of said counting;
- wherein said terminal count output of said counter corresponds to the output of said variable frequency signal generating circuit.

11. A communication system, comprising:
- a transmission channel having a first port and a second port;
- a modulation circuit for generating a frequency modulated signal according to a sequence of input data elements, comprising:
  - means for generating a predetermined portion of a cycle of said frequency modulated signal, said generating means having an input for receiving said input data elements, and having an output connected to said first port of said transmission channel to present said portion of said cycle over a period of time according to the value of the input data element applied to its input; and
  - means, coupled to the output of said generating means, for applying one of said input data elements in said sequence to said input of said generating means, at a predetermined point in the cycle of said frequency modulated signal; and
- a demodulation circuit, coupled to said second port of said transmission channel, for generating a sequence of output data elements according to the frequency modulated signal generated by said modulation circuit, said demodulation circuit comprising:
  - an identifying circuit for detecting a predetermined point in the cycle of the frequency modulated signal at said second port;
  - a clock generator for supplying a clock signal exhibiting a frequency greater than that of said frequency modulated signal;
  - a counter having a clock input coupled to said clock generator, having an enabling input coupled to said identifying circuit, and having an output for supplying a duration value; and
  - a translation circuit for translating said duration value into an amplitude value, said amplitude value serving as an output data element.

12. A system as claimed in claim 11 wherein said applying means comprises:
- a buffer, having a data input for receiving said sequence of input data elements, having a control input, and having an output at which it presents one of its received input data elements in sequence, in response to a control signal received at said control input; and
- means, having an input coupled to the output of said generating means, and having an output coupled to said control input of said buffer, for detecting said predetermined point in the cycle of said frequency modulated signal and for generating said control signal in response thereto.

13. A system as claimed in claim 11 wherein said predetermined portion of said cycle is approximately a half cycle.

14. A system as claimed in claim 11;
- wherein said frequency modulated signal exhibits a positive and a negative peak value in successive ones of said predetermined portions of said cycle;
- and wherein said predetermined point in the cycle is at an amplitude approximately the midpoint of said positive and negative peak values.

15. A system as claimed in claim 11, wherein said identifying circuit comprises:
- a limiter for converting said frequency modulated signal received at said second port into a substantially bipolar signal having rising and falling edges, such that the timing of said edges convey said digital data.

16. A system as claimed in claim 11, wherein said translation circuit comprises:
- a memory circuit for performing a table look-up operation using said duration value as a table index.

17. A method of transmitting a modulated signal corresponding to a sequence of data symbols, comprising the steps of:
- receiving a sequence comprising a first symbol followed by a second symbol;
- generating a first portion of a cycle of a signal at a frequency corresponding to said first symbol, said signal having predetermined maximum and minimum amplitudes, said generating step comprising:
  - applying a first start count corresponding to said first symbol to a data input of a counter;
  - applying a clock signal to a clock input of said counter, said clock signal having a frequency higher than that of said modulated signal; and
  - presenting a first output signal indicating completion of the number of cycles of said clock signal corresponding to said first start count; and
- generating a second portion of said cycle of said signal at a frequency corresponding to said second symbol in such a manner that said first portion of said cycle terminates and said second portion of said cycle begins approximately when said modulated signal has an amplitude near the midpoint of said maximum and minimum amplitudes, said step of generating said second portion of said cycle comprising:
  - monitoring a count output of said counter;
  - applying a second start count corresponding to said second symbol to the data input of said counter responsive to the value at said count output reaching a selected value;
  - applying said clock signal to the clock input of said counter; and
  - presenting a second output signal indicating completion of the number of cycles of said clock signal corresponding to said second start count, said sequence of first and second output signals corresponding to said modulated signal.

18. A method as claimed in claim 17 wherein said first and second portions of said signal are each approximately a half cycle.

19. A method of communicating data through a transmission channel, comprising the steps of:
   receiving a sequence of input data comprising a first symbol followed by a second symbol;
   generating a first portion of a cycle of a modulated signal at a frequency corresponding to said first symbol, said modulated signal having predetermined maximum and minimum amplitudes;
   generating a second portion of said cycle of said modulated signal at a frequency corresponding to said second symbol in such a manner that said first portion of said cycle terminates and said second portion of said cycle begins approximately when said modulated signal has an amplitude near the midpoint of said maximum and minimum amplitudes;
   transmitting said modulated signal into said transmission channel;
   receiving said modulated signal from said transmission channel;
   monitoring the amplitude of said received modulated signal to identify first and second points in a cycle of said modulated signal;
   measuring the number of events, occurring at a frequency greater than the frequency of said modulated signal, which occur between said first and second points in said cycle; and
   translating the measured number of events into an amplitude value corresponding to the symbol from which each portion of said cycle was generated.

20. A method as claimed in claim 19 wherein said modulated signal is generated by a signal generating circuit responsive to input signals corresponding to said sequence of data symbols;
   and wherein said step of generating said second portion of said modulated signal comprises:
   monitoring the amplitude of said modulated signal during said first portion of said cycle;
   generating a control signal in response to said modulated signal crossing a predetermined amplitude threshold; and
   applying an input signal corresponding to said second symbol to said signal generating circuit, in response to said control signal.

21. A method as claimed in claim 19 wherein said said first and second portions of said modulated signal are each approximately a half cycle.

22. A method as claimed in claim 19, wherein said measuring step comprises the steps of:
   beginning at said first point in said cycle, counting the number of cycles of a clock signal having a frequency greater than the frequency of said modulated signal; and
   halting said counting at said second point of said cycle so that the number of said cycles counted corresponds to the duration of time between said first and second points of said cycle.

23. A method as claimed in claim 19, wherein:
   said measuring step supplies one of a finite integral number of potential discrete duration values to said translating step; and
   said translating step comprises the step of associating, in a data table stored in a memory, one of a finite integral number of amplitude data values for each one of said finite integral number of potential discrete duration values so that a table look-up operation in said data table produces said amplitude value descriptive of said symbol.

24. A method as claimed in claim 19, wherein:
   said measuring step supplies one of a finite integral number of potential discrete duration values to said translating step; and
   said translating step comprises the step of associating, in a data table stored in a memory, each one of said finite integral number of potential discrete duration value with its own stored data symbol, wherein each of said stored data symbols includes a plurality of data bits.

* * * * *